United States Patent [19]

Omata

[11] Patent Number: 4,618,039
[45] Date of Patent: Oct. 21, 1986

[54] ONE-WAY CLUTCH

[75] Inventor: Nobuaki Omata, Yokohama, Japan

[73] Assignee: Nifco Inc., Yokohama, Japan

[21] Appl. No.: 601,900

[22] Filed: Apr. 19, 1984

[51] Int. Cl.[4] ............................................ F16D 67/02
[52] U.S. Cl. .................................... 192/4 B; 192/46; 192/12 A
[58] Field of Search ............... 192/20, 41 R, 46, 4 B, 192/12 A, 14; 74/332, 352, 353, 354, 406, 399, 411.5, 789; 188/290, 291; 360/90, 93, 96.1, 96.6

[56] References Cited

U.S. PATENT DOCUMENTS

| 2,953,222 | 9/1960 | Waldron | 188/290 |
| 4,069,545 | 1/1978 | Holet et al. | 188/291 |
| 4,325,091 | 4/1982 | Vchida | 360/96.6 |
| 4,365,525 | 12/1982 | Imazaike | 360/96.6 |

FOREIGN PATENT DOCUMENTS 146654 11/1980 Japan .................................. 360/96.6

Primary Examiner—George H. Krizmanich
Attorney, Agent, or Firm—Trexler, Bushnell & Wolters, Ltd.

[57] ABSTRACT

A one-way clutch comprises a stationary panel rotatably supporting in place an inner toothed ring possessing inner teeth, an output toothed wheel provided on the stationary panel at a position not to be meshed with the inner teeth of the inner toothed ring, and a planet gear interposed between the inner teeth and the output toothed wheel and adapted to be meshed with or separated from the output toothed wheel, depending on the direction of rotation of the inner toothed ring. This one-way clutch, with a braking plate attached to the output toothed wheel thereof and sealed in a damper housing together with viscous oil, can be utilized as a damper for a lid in a machine for the purpose of absorbing shocks produced only while the lid is being opened.

9 Claims, 5 Drawing Figures

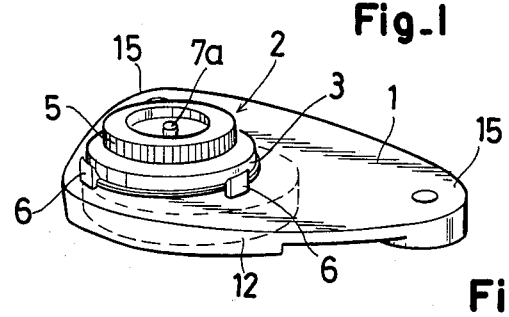
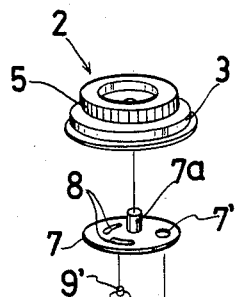
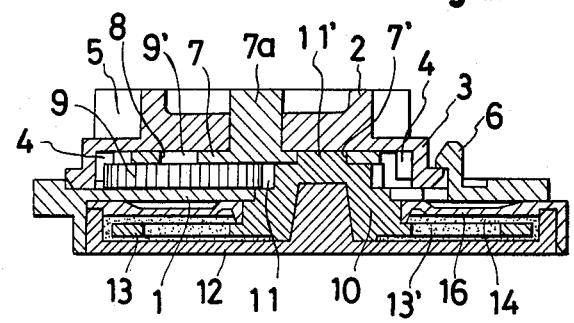
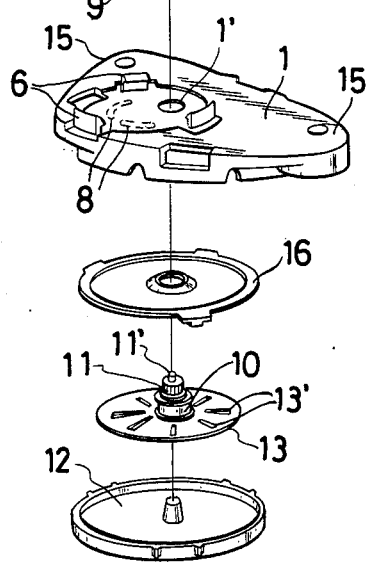
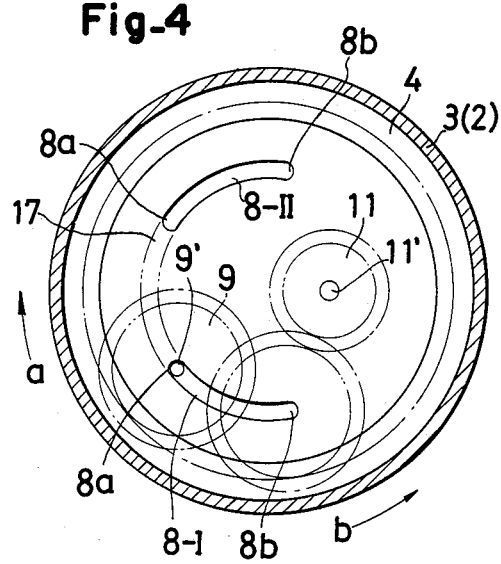

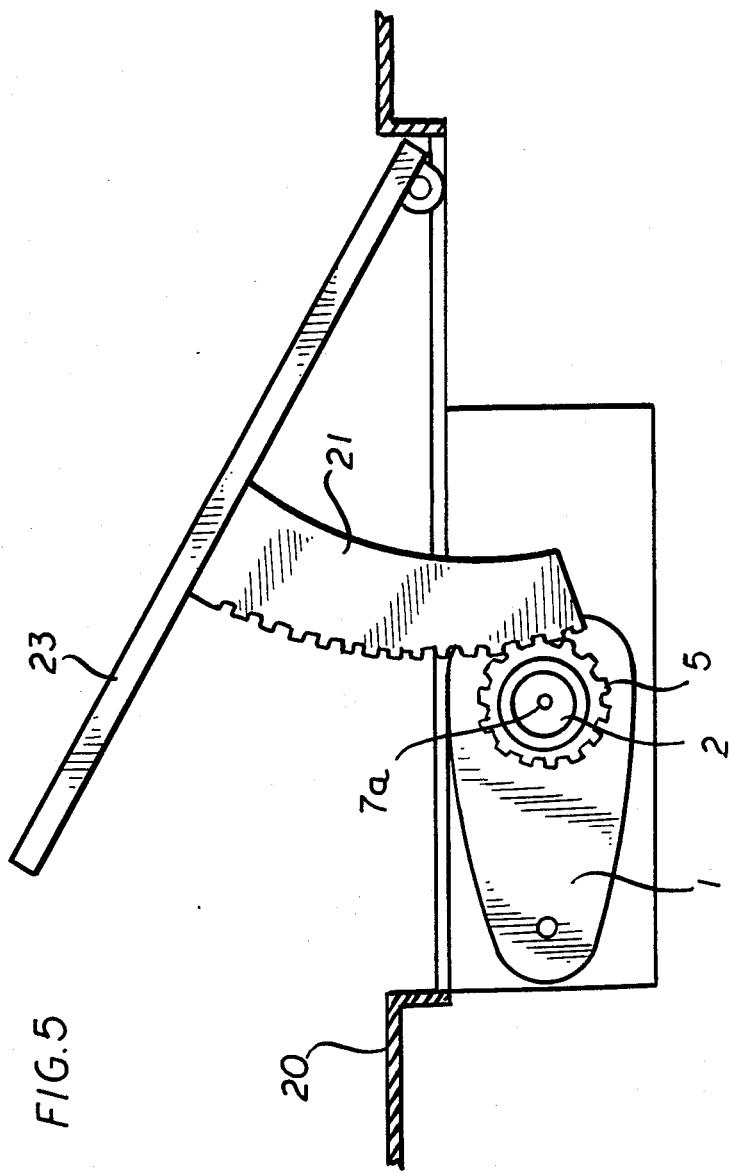

ONE-WAY CLUTCH

BACKGROUND OF THE INVENTION

This invention relates to a one-way clutch which either produces or refrains from producing a rotational output, depending on the direction of the rotational input. More particularly, the present invention relates to a one-way clutch which is effectively utilized as one element of a damper device capable of absorbing the shocks of an opening or closing motion of a lid in a cassette tape recorder or video tape recorder and which generates a shock-absorbing function while the lid is being opened and remains inactive while the lid is being closed.

Various types of one-way clutches have been heretofore proposed, including spring type, ratchet type, free wheel type, and planet type clutches.

The spring type clutch is formed by encasing a coil spring in a cylinder on the driving shaft side or the driven shaft side in such a manner that the driven shaft or driving shaft will come into sliding contact with the inside boundary of the coil spring. In this spring type clutch, the driving shaft produces idle rotation while the clutch is rotated in one direction relative to the direction of the winding of the coil spring and the coil spring contracts or expands radially to effect transfer of motion from the driving shaft to the driven shaft while the clutch is rotated in the other direction. This spring type clutch has the disadvantage that the transfer loss is increased and the durability is decreased in proportion as the load on the driven shaft side increases.

The ratchet type clutch comprises a ratchet pawl and a ratchet wheel. This ratchet type clutch provides efficient transfer of rotation in one direction but produces a clicking noise while it is producing idle rotation in the other direction.

The free wheel type clutch has a roller encased in a wedge-shaped empty space formed between a driving shaft and a driven shaft and effects transfer of motion by virtue of the friction arising from the wedge effect. When the rotation is reversed from the idle rotation, the transfer of motion is delayed by the time which is spent by the roller during its motion through the wedge-shaped empty space. The free wheel type clutch suffers not merely from this slow response but also from a loss of motion by slippage which is too large to be ignored.

The planet gear type one-way clutch comprises an inner toothed ring having inner teeth on a cylindrical wall, a panel fitted to the inner wall of the inner toothed ring and adapted to be rotated relative to the aforementioned inner wall of the inner toothed ring, and a shaft pivotally attached to the aforementioned panel, so that during the rotation of the inner toothed ring in one direction, the shaft will be meshed with the inner teeth to set the panel rotating in concert with the inner toothed ring and induce rotation of the shaft fixed to the panel and, during the rotation of the inner toothed ring in the other direction, the shaft will break engagement with the inner teeth to leave only the inner toothed ring in idle rotation. As compared with the conventional type which constantly maintains a ratchet pawl drawn with a spring and meshed with the ratchet inner teeth of an inner toothed ring, this planet gear type clutch has a unique effect in that it eliminates the clicking noise otherwise generated during idle rotation of the inner toothed ring. It nevertheless has the disadvantage that the construction thereof is somewhat complicated and the number of component parts used therein is quite large.

It is conceivable to use any of the clutches described above in a shock-absorbing device in a mechanism for opening and closing a lid in various types of machines to fulfill the purpose of producing an amply braked opening motion while the lid is being opened and releasing the braking force while the lid is being closed thereby protecting the machine against the shocks of the opening and closing motions of the lid and, at the same time, ensuring smooth opening and closing motions. The conventional dampers usable in applications of this nature come in various types including the oil type and the air type, for example. To be more specific, when a rotary damper is incorporated as in a mechanism for opening and closing a lid-like cassette holder case in a video tape recorder or a mechanism for opening and closing a lid of an instrument in an automobile for the purpose of absorbing abrupt motion of the lid while the lid is being moved by a spring from its closed state, the rotary damper is similarly actuated when the lid in open state is closed by a push with the hand. Thus, the lid is hindered from being lightly closed. In this case, the difficulty might be removed by incorporating a one-way clutch in addition to the rotary damper so that while the lid is being closed, the one-way clutch prevents the motion of the lid from being transferred to the rotary damper and the rotary damper is actuated only when the lid is opened from its closed state. To permit this additional incorporation of the one-way clutch, however, it would be necessary for the separately produced rotary damper and one-way clutch to be joined with the former's output shaft connected to the latter's input shaft and, in the joined state, incorporated into the mechanism. Thus, the mechanism incorporating them both would become quite bulky.

SUMMARY OF THE INVENTION

An object of this invention is to provide a one-way clutch which possesses the ability to abate noise and vibration and has high operational efficiency comparable with those of the planet gear type clutch and, at the same time, permits desired simplification of the construction and reduction of the size and weight.

Another object of this invention is to provide a one-way clutch which manifests an effect of braking and damping the shocks generated when a lid for opening and closing a mechanical device is opened, refrains from producing any braking motion when the lid is closed, and consequently enables the lid to be opened and closed smoothly and which, therefore, is applicable to a rotary damper used in the lid.

The objects described above are accomplished by providing a one-way clutch which comprises in combination an inner toothed ring having inner teeth formed on the inner wall of a cylindrical wall, a stationary panel for rotatably supporting the inner toothed ring in place, an output toothed wheel having a shaft thereof extended through the stationary panel and being pivotally attached to the stationary panel in such a manner as to avoid having the teeth thereof meshed with the inner toothed ring, and a planet gear kept constantly meshed with the inner teeth and adapted to move to approach the output toothed wheel and come into engagement therewith or separate from the output toothed wheel and break engagement therewith, depending on the direction of rotation of the inner toothed ring.

The planet gear enclosed in the inner toothed wheel, depending on the direction of rotation of the stationary panel, interposes itself between the teeth formed on the inner wall of the inner toothed ring and the output toothed wheel or separates itself therefrom. Generation of noise, transfer loss, and other drawbacks inevitably suffered heretofore are avoided because the planet gear interposes itself between the teeth of the inner toothed ring and the output toothed wheel and transfers rotation therebetween. By disposing on the stationary panel a guide path adapted to guide the planet gear, the planet gear is enabled to operate accurately along the shortest operating route possible to ensure safe transfer or transferring motion.

Optionally, a braking plate may be fastened to the output toothed wheel and encased in conjunction with braking oil within a damper housing. Then the one-way clutch will function as a damper for braking and damping shocks of the opening and closing motion of a lid. Owing to the operation of the one-way clutch of the construction described above, this damper is capable of applying a braking effect on the opening motion of the lid and enabling the lid to be closed without being braked. The other objects and characteristics of this invention will become apparent from the further disclosure of the invention to be made in the following description of preferred embodiments, with reference to the accompanying drawings.

BRIEF EXPLANATION OF THE DRAWINGS

FIG. 1 is a perspective view illustrating a typical one-way clutch of the present invention in its entirety.

FIG. 2 is a longitudinal side view of the one-way clutch of FIG. 1.

FIG. 3 is a perspective view of the same one-way clutch in a disassembled state.

FIG. 4 is an explanatory diagram illustrating the operation of the one-way clutch.

FIG. 5 is a fragmentary partial sectional view showing a typical assembly including a one-way clutch of the present invention and a movable lid.

DESCRIPTION OF THE PREFERRED EMBODIMENTS

This invention relates to a one-way clutch applicable particularly to a damper which manifests a function of applying a braking effect only to the opening motion of a lid serving to open and close a machine. First, the fundamental construction of the clutch will be described. In the drawings, 1 denotes a stationary panel and 2 an inner toothed ring comprising a cylindrical wall 3 having an inner toothed wheel 4 formed on the inner wall thereof and teeth 5 formed on the outer wall thereof and adapted to receive rotational input. On one side of the stationary panel, a plurality of snap claws 6 are raised from positions enclosing the outer boundary of the cylindrical wall. When the cylindrical wall 3 is pushed into the space defined by the claws 6, the snap claws catch hold of the shoulder of the cylindrical wall extended outwardly from the outer boundary thereof and retain the inner toothed ring rotatably while the end face of the cylindrical wall remains in contact with the surface of the stationary panel.

Inside the cylindrical wall 3, an auxiliary plate 7 is encased rotatably relative to the cylindrical wall. This auxiliary plate 7 is provided with a guide path 8-I formed as an arcuate hole or arcuate groove concentric with the inner teeth. The shaft 9' of a planet gear 9 constantly meshed with the inner toothed wheel 4 is set in place in the guide path 8 for the purpose of enabling the planet gear 9 to be moved along the guide path inside the cylindrical wall. Denoted by 10 is a piercing shaft retained rotatably in a circular hole 1' of the stationary panel. An output toothed wheel 11 incapable of being meshed with the inner toothed wheel 4 is formed on the leading end of this shaft. The teeth of the plane gear 9 and those of the output toothed wheel 11 are identical in shape with the inner teeth. When the planet gear 9 assumes its position at one end 8b of the guide path near the output toothed wheel 11, it is meshed with the output toothed wheel as well as with the inner toothed wheel 4. As it is moved from this position in the direction of the other end 8a of the guide path, it gradually departs from the output toothed wheel 11. When it is positioned at the other end 8a, it still remains in mesh with the inner toothed wheel 4 but is no longer in contact with the output toothed wheel 11.

When the planet gear 9 is positioned at the end 8a of the guide path as illustrated in FIG. 4 and the inner toothed ring 2 then happens to be rotated clockwise as indicated by the arrow a under a rotational input, the planet gear remains at rest at that position and produces idle rotation in the same direction as the inner toothed ring 2. Thus, it is in the state of a disengaged clutch incapable of transferring any rotation to the output toothed wheel. When the inner toothed ring 2 starts rotating counterclockwise as indicated by the arrow b, the planet gear 9 revolved while rotating in the same direction as the inner toothed ring 2, moves along the guide path in the direction of the end 8b thereof, gradually approaches the output toothed wheel 11 and finally comes into engagement therewith, and causes the output toothed wheel to rotate clockwise rotation. Thus, the planet gear 9 is in the state of an engaged clutch. When the inner toothed wheel 4 in this state changes its rotation towards the clockwise direction, the planet gear 9 starts revolving, moves along the guide path in the direction of the end 8a thereof, and again assumes the state of a disengaged clutch.

In accordance with this invention, there is provided a one-way clutch of a simple construction formed of a very small number of component parts and adapted to assume the state of a disengaged clutch incapable of rotating the output shaft or the state of an engaged clutch capable of rotating the output shaft, depending on the direction of rotation of the inner toothed ring.

The auxiliary plate 7 is provided with a central shaft 7a which extends into the central hole on the bottom of the cylindrical wall 3. The output toothed wheel 11 is provided with a protuberance 11' which extends into an eccentric hole 7' of the auxiliary plate 7. Consequently, the auxiliary plate is located within the cylindrical wall 3 and hindered from free rotation.

It is possible to realize a damper for a lid having the additional function of a one-way clutch by integrally attaching a damper mechanism to the output side of a one-way clutch of the fundamental construction described above. Now, this combination of a one-way clutch and a damper will be described below.

On the other side of the stationary panel 1, a housing 12 for a damper is attached concentrically with the aforementioned shaft 10. At the end of the piercing shaft 10 extended into the housing 12, a braking plate 13 capable of rotating inside the housing is disposed. The interior of the housing is filled to capacity with oil 14 of high viscosity such as silicone oil. When necessary for improvement of the braking effect, the braking plate 13 may be provided with removed parts 13' such as holes bored through the plate itself or notches formed along the periphery thereof. When the output toothed wheel 11 is rotated by the rotational input generated because of its engagement with the planet gear 9, the braking plate 13 connected integrally to the output toothed wheel through the medium of the piercing shaft 10 is compelled to rotate in the oil. Consequently, the rotational input which imparts rotational force to the inner toothed ring 2 is restrained. This restraint serves, for example, to damper the shocks liable to occur when a lid is suddenly opened by the force of a spring.

For the prevention of leakage of oil into the one-way clutch through the interface between the piercing shaft 10 and the circular hole 1', it suffices to fit a packing 16 on the portion of the piercing shaft 10 extend into the housing 12 to seal the interface and allow the peripheral part of the packing to be nipped between the stationary panel 1 and the housing 12. Alternatively, the damping effect may be obtained without using such a medium as oil by adapting the aforementioned braking plate 13 so as to be held in sliding contact with the inner wall of the housing.

In accordance with this invention, the stationary panel 1 or an apron portion 15 extended outwardly from the housing 12 is secured as shown in FIG. 5 of a video tape recorder 20 or an instrument board in an automobile and the teeth 5 on the outer wall of the inner toothed ring 2 are meshed with a sector wheel 21 disposed on the recorder or the automobile body lid 23 or fastened thereto with the apron portion 15 and the teeth on the outer wall of the inner toothed ring meshed with a sector wheel on the lid side. Consequently, the lid can be closed lightly by a push of the hand because the inner toothed ring 2 and the planet gear 9 are allowed in this case to rotate freely. Release of the lid from its closed state can be obtained by first releasing its lock by means of a push button, for example, and allowing the lid to be opened as by the force of a spring while the shock of the sudden motion of the lid is braked and damped by the one-way clutch provided with the damper as described above.

The combination of the one-way clutch and the rotary damper has a notably small size because the stationary panel 1 concurrently serves as parts of the walls of the one-way clutch and the rotary damper and the piercing shaft 10 passing through the stationary panel concurrently serves as the output shaft for the one-way clutch and the input shaft for the rotary damper. Further, the incorporation of the combination into the lid mechanism requires much less work than when the one-way clutch and the rotary damper are independently assembled and incorporated into the lid mechanism. This contributes greatly to simplifying the assembly on the production line and improving the productivity of the operation.

If two guide paths 8-I and 8-II are formed as illustrated, by selectly inserting the shaft of the planet gear in one or the other of the guide paths, the one-way clutch can be produced in a type capable of braking the rotational input by the clockwise rotation of the clutch or a type capable of braking the rotational input by the counterclockwise rotation thereof.

The guide paths may be formed in the surface of the stationary panel 1 as indicated by the broken line in FIG. 3. This arrangement permits omission of the auxiliary plate 7. This is advantageous in that the overall thickness of the one-way clutch can be decreased by the thickness of the auxiliary plate and the overall volume thereof proportionally decreased.

The two symmetrically formed guide paths may be interconnected with a connecting path 17 having the same curvature as the guide paths as shown by the broken line in FIG. 4. In this arrangement, when the planet gear 9 moves through the guide path 8-I in the direction of the end 8a and departs from the output toothed wheel 11, it continues its movement through the connecting path 17 joining the ends 8a of the two guide paths to each other and finally reaches the end 8b of the other guide path 8-II. At this point, the planet gear comes into engagement with the output toothed wheel 11 from the opposite side and starts the output toothed wheel rotating in the opposite direction. Thus, the output toothed wheel suspends its rotation while the planet gear is in motion from the end 8b of the guide path 8-I in the direction of the other guide path 8-II. When the planet gear reaches the end of the guide path 8-II, the output toothed wheel is automatically set rotating in the opposite direction. This arrangement constitutes one possible modification of the one-way clutch contemplated by the present invention.

There is no particular limitation in this invention on the kind of material of which the component parts of the one-way clutch are formed. When all the components are molded of a plastic material, however, the one-way clutch enjoys a notable reduction in weight.

What is claimed is:

1. A one-way clutch comprising in combination an inner toothed ring having inner teeth, a stationary panel rotatably supporting said inner toothed ring at one side thereof, an output toothed wheel having a shaft passing through a hole in said stationary panel and being pivotally attached to said stationary panel at a position at which said output toothed wheel is not allowed to come into contact with said inner toothed ring, and a planet gear constantly kept in mesh with said inner teeth and adapted to approach and come into engagement with said output toothed wheel, or depart from and break engagement with said output toothed wheel, depending on the direction of rotation of said inner toothed ring.

2. A one-way clutch according to claim 1, which includes guide path means for admitting a shaft of said planet gear and thereby guiding the motion of said planet gear.

3. A one-way clutch according to claim 1, which includes a braking plate stationarily formed on said output toothed wheel, said shaft of said output toothed wheel extending through said circular hole from a side opposite said one side and said braking plate being sealed together with oil in a damper housing.

4. A one-way clutch according to claim 2, which includes a braking plate stationarily formed on said output toothed wheel, said shaft of said output toothed wheel extending through said circular hole from a side opposite said one side, and said braking plate being sealed together with oil in a damper housing.

5. A one-way clutch according to claim 1, wherein said inner toothed ring is pivotally supported by a central shaft formed on an auxiliary plate, said auxiliary plate is provided with an eccentric hole at the position opposed to said hole formed in said stationary panel, and said auxiliary plate is provided with a guide path for admitting a shaft of said planet gear and thereby guiding the motion of said planet gear.

6. A one-way clutch according to claim 5, which includes a braking plate stationarily formed on said output toothed wheel and located at a side of said stationary panel opposite from said one side, and an oil filled damper housing enclosing said braking plate.

7. A one-way clutch according to claim 3, wherein said stationary panel is secured on a given machine and teeth on the outer surface of said inner toothed ring are meshed with stationary teeth formed on a lid adapted to be freely opened and closed by means of a hinge, to give rise to a one-way damper for said lid.

8. A one-way clutch according to claim 4, wherein said stationary panel is secured on a given machine and teeth on the outer surface of said inner toothed ring are meshed with stationary teeth formed on a lid adapted to be freely opened and closed by means of a hinge, to give rise to a one-way damper for said lid.

9. A one-way clutch according to claim 6, wherein said stationary panel is secured on a given machine and teeth on the outer surface of said inner toothed ring are meshed with stationary teeth formed on a lid adapted to be freely opened and closed by means of a hinge, to give rise to a one-way damper for said lid.

* * * * *